(12) United States Patent
Sin

(10) Patent No.: US 7,616,761 B1
(45) Date of Patent: Nov. 10, 2009

(54) USER INTERFACE WITH KEY TIMEOUT

(75) Inventor: Sam K. Sin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 911 days.

(21) Appl. No.: 11/341,103

(22) Filed: Jan. 27, 2006

(51) Int. Cl.
*H04M 1/00* (2006.01)
(52) U.S. Cl. .............................. 379/433.07; 379/93.23
(58) Field of Classification Search ............ 379/433.07, 379/433.06, 93.23
See application file for complete search history.

(56) References Cited

U.S. PATENT DOCUMENTS

| | | |
|---|---|---|
| 6,381,474 B1 | 4/2002 | Kraft |
| 6,408,068 B1 | 6/2002 | Larson et al. |
| 6,757,372 B1 | 6/2004 | Dunlap et al. |
| 6,899,273 B2 | 5/2005 | Hussey et al. |
| 2003/0086540 A1* | 5/2003 | Brandt ........................ 379/52 |
| 2003/0231208 A1 | 12/2003 | Hanon et al. |
| 2005/0074031 A1 | 4/2005 | Sunstrum |
| 2005/0080496 A1 | 4/2005 | Hayes et al. |
| 2005/0111438 A1 | 5/2005 | Kim |
| 2005/0114798 A1 | 5/2005 | Jiang et al. |

* cited by examiner

*Primary Examiner*—Creighton Smith
(74) *Attorney, Agent, or Firm*—Haynes and Boone, LLP.

(57) ABSTRACT

An electronic device, such as a telephone, includes a key operable to be pressed into a depressed position, said key being associated with a function, and a control system for initiating the function associated with the key, wherein if the key is pressed into the depressed position and released within a timeout period, the control initiates the function upon release of the key, and if the key is pressed into the depressed position and retained in the depressed position for the timeout period, the control system does not initiate the function upon release of the key.

23 Claims, 4 Drawing Sheets

USER INTERFACE WITH KEY TIMEOUT

BACKGROUND

Many telephones, particularly those used in businesses, provide a large number of features and functions, including the support of multiple telephone lines, speed dial, call history, call hold, call forwarding, directory search, and the like. In many cases, the telephones include a display, such as a small LCD screen, for displaying information about the phone and calls made using the phone. Most phones include a conventional 12-key keypad including buttons for the asterisk (*), the pound (#), and the numbers 0 through 9. Additional buttons may also be provided for selecting lines and for invoking the other features of the telephone, such as hold, speakerphone, and transfer.

Due to the large number of functions available on the phone and the desire to provide flexibility in the user interface for the phone, many phones are provided with soft keys. Each soft key includes a text label shown on the telephone display and a corresponding button associated with the text label. The telephone control system operates to translate a touch on the button into the activity displayed on the text label.

In the hectic day of a typical employee, it is not uncommon for the telephone user to inadvertently press the wrong button when operating the phone. Accordingly, it would be desirable to provide an improved telephone user interface that would accommodate erroneous keypresses.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

Figure 1:
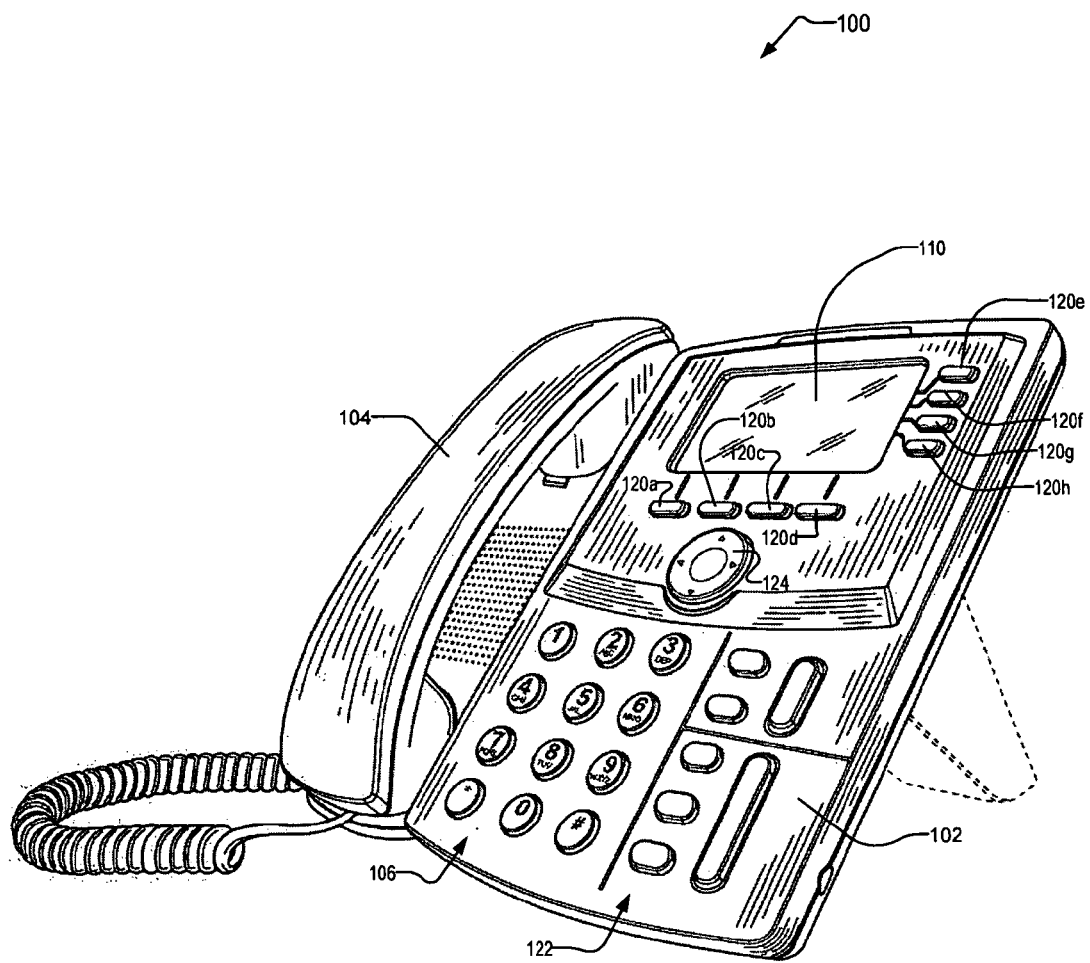
FIG. 1 shows a telephone in accordance with embodiments of the present invention.

In accordance with embodiments of the present invention, telephone systems and methods of operating a telephone are provided. FIG. 1 shows a telephone 100, in accordance with embodiments of the present invention. The telephone 100 comprises a telecommunications device for transmitting and receiving audio. The telephone 100 may utilize various mechanisms for placing and receiving telephone calls, e.g., the public switched telephone network, a PBX ("private branch exchange"), a cellular network, or a VoIP network.

The telephone 100 comprises a base 102 and a handset 104. The handset 104 is provided with a microphone and a speaker. The telephone 100 further includes a 12-key keypad 106, definable soft keys 120a-120h, an additional set of function keys 122, a navigational key 124, and an LCD display 110. In addition, the telephone 100 may include one or more indicator lights (e.g., LEDs) for indicating various operational states of the telephone 100 (e.g., speakerphone on/off, line active, line hold, etc.).

Figure 2:
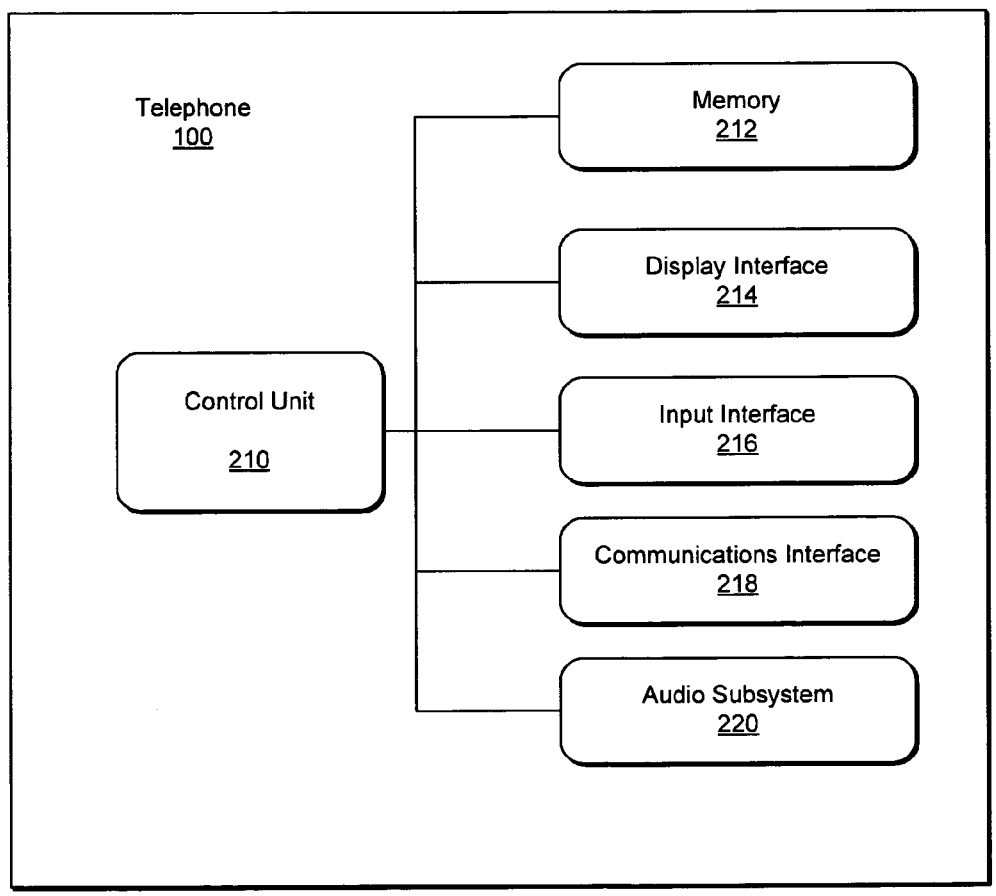
FIG. 2 is a block diagram of the telephone, in accordance with embodiments of the present invention.

FIG. 2 is a block diagram of the telephone 100, in accordance with embodiments of the present invention. The telephone 100 comprises a memory 212, a display interface 214 for generating the images on the display 110 and activating other indicator lights, an input interface 216 for receiving keypress inputs from the user, a communications interface 218 for coupling with a telecommunications network, an audio subsystem 220 for generating sound and converting the user's voice into an electrical signal, and a control unit 210 for controlling the operation of the phone 100. The physical interface for the communications interface 218 may comprise, e.g., an RJ-45 port for connection with an Ethernet network or an RJ-11 port for connection with a telephone jack. It will be understood that FIG. 2 is a simplified block diagram and that other components of the telephone 100 exist but are not shown.

The function of each of the soft keys 120a-120h can be indicated by text and/or graphics shown on the display 110 at a location adjacent to the key 120a-120h. The keys 120a-120h can be defined to perform any of a variety of functions. In some embodiments, the function performed by each key 120a-120h may change, depending on the current state of the telephone. For example, when the telephone 100 is not in use, the keys 120a-120h may have no function and the display 110 may be blank or provide some other information to the user (e.g., date and time, extension number, etc.). When a call is in progress, the keys 120a-120h may then be activated to perform various functions when actuated, such as to place the call on hold, forward the call to another extension, to drop the call, or to access another menu of additional functions. When these functions are activated, descriptive text, such as HOLD, FORWARD, DROP, or MORE, may be displayed adjacent each of the keys 120a-120h.

In some embodiments, the keys 120a-120d provided along the horizontal bottom edge of the display 110 are used for performing various functions, while the keys 120e-120h provided along the vertical side edge of the display 110 are used for selecting from a plurality of lines or extensions.

The additional set of function keys 122 can be used to activate various functions or modes. They keys 122 may be used to access voice mail, control volume, activate the speakerphone, or the like. In some embodiments these function keys 122 may be programmable, but are typically reserved for a single function, in contrast with the soft keys 120, which may change functions depending on the state of the phone. Thus, the function keys 122 can have fixed labels identifying their function and need not have their functions displayed on the display 110.

In many conventional telephones, when a soft key is depressed, the function associated with that soft key is immediately performed. Accordingly, if a user inadvertently presses the wrong soft key, there is nothing that the user can do to abort the performance of the function. In accordance with embodiments of the present invention, the function associated with one or more of the soft keys 120a-120h is initiated upon release of the soft key 120. In addition, a timeout period is associated with that soft key 120 such that if the soft key 120 is retained in the depressed position for the timeout period (e.g., three seconds, five seconds, etc.), the function is aborted. After the function is aborted, when the soft key 120 is released, no function is performed. Thus, if a user inadvertently presses the wrong soft key 120, the user can merely hold onto the soft key 120 for the duration of the timeout period before releasing the soft key 120.

In accordance with some embodiments, a visual indication of the completion of the timeout period is provided to the user. For example, the display 110 may display an indicator when a soft key 120 is depressed. The indicator will remain displayed as the user retains the soft key 120 in the depressed position until the timeout period completes. After the timeout period has elapsed, the indicator will disappear. In other embodiments, the display 110 will display an indicator after the timeout period has elapsed.

Figure 3A:
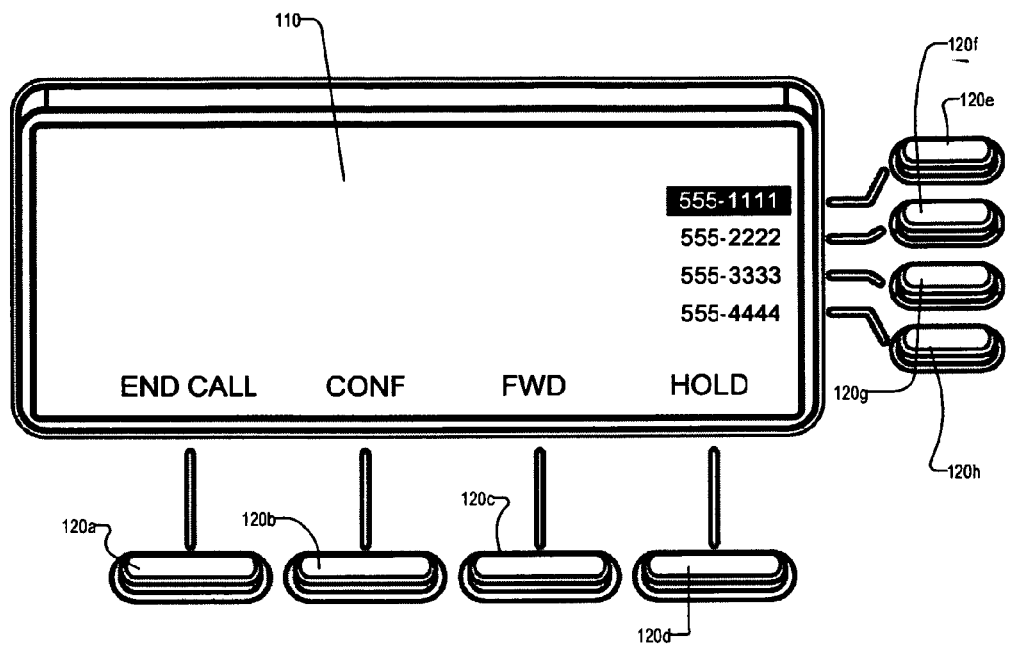
FIGS. 3A-3B illustrate the timeout of a soft key, in accordance with embodiments of the present invention.
Figure 3B:
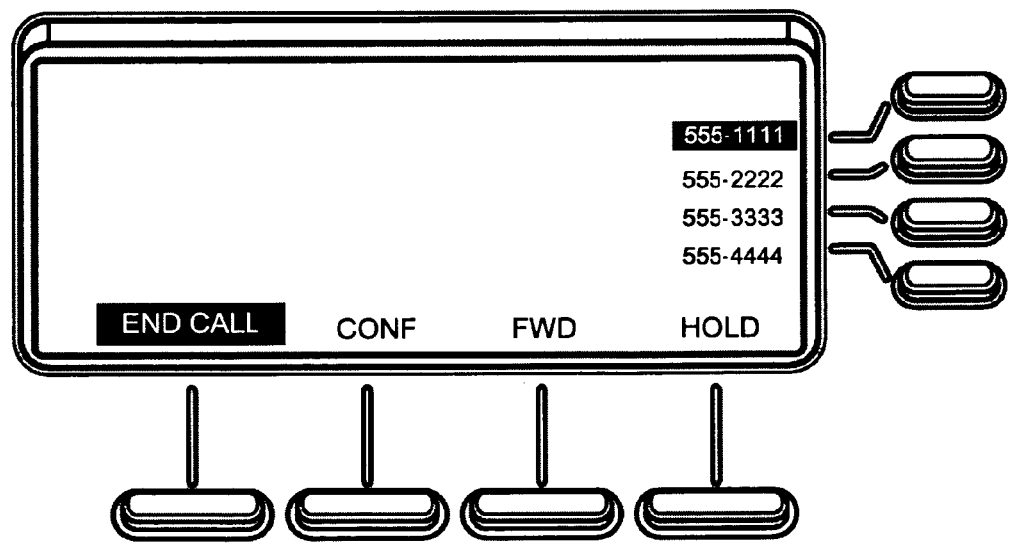

FIGS. 3A-3B illustrate the timeout of a soft key 120a, in accordance with embodiments of the present invention. FIG. 3A shows the state of the display 110 while a call is in progress on the line for telephone number 555-1111, which is associated with soft key 120e. In this embodiment, the soft key 120a is associated with the END CALL function, which terminates a call in progress. The association between the soft key 120a and the END CALL function is indicated by the text "END CALL", which is displayed on the display 110 adjacent to the soft key 120a. The soft key 120b is associated with the CONF function, which allows a user to initiate a conference call, the soft key 120c is associated with the FWD function, which allows a user to forward a pending call to another line, and the soft key 120d is associated with the HOLD function, which places a pending call on hold. The soft keys 120e-120g are associated with four different lines.

FIG. 3B shows the state of the display 110 immediately after the user has pressed the soft key 120a. The "END CALL" text in the display 110 is highlighted to indicate to the user that the key has been depressed. If the user immediately releases the soft key 120a, the END CALL function is initiated upon release of the soft key 120a. If the user retains the soft key 120a in the depressed position, the control unit 210 will time the duration of the depression. After the depression duration has passed the predetermined timeout period, the END CALL function will be aborted. To indicate the timeout to the user, the highlighting of the "END CALL" text will disappear and the display 110 will return to the state shown in FIG. 3A. Then, when the user releases the soft key 120a, the telephone will take no action and the pending call will continue.

Figure 4:
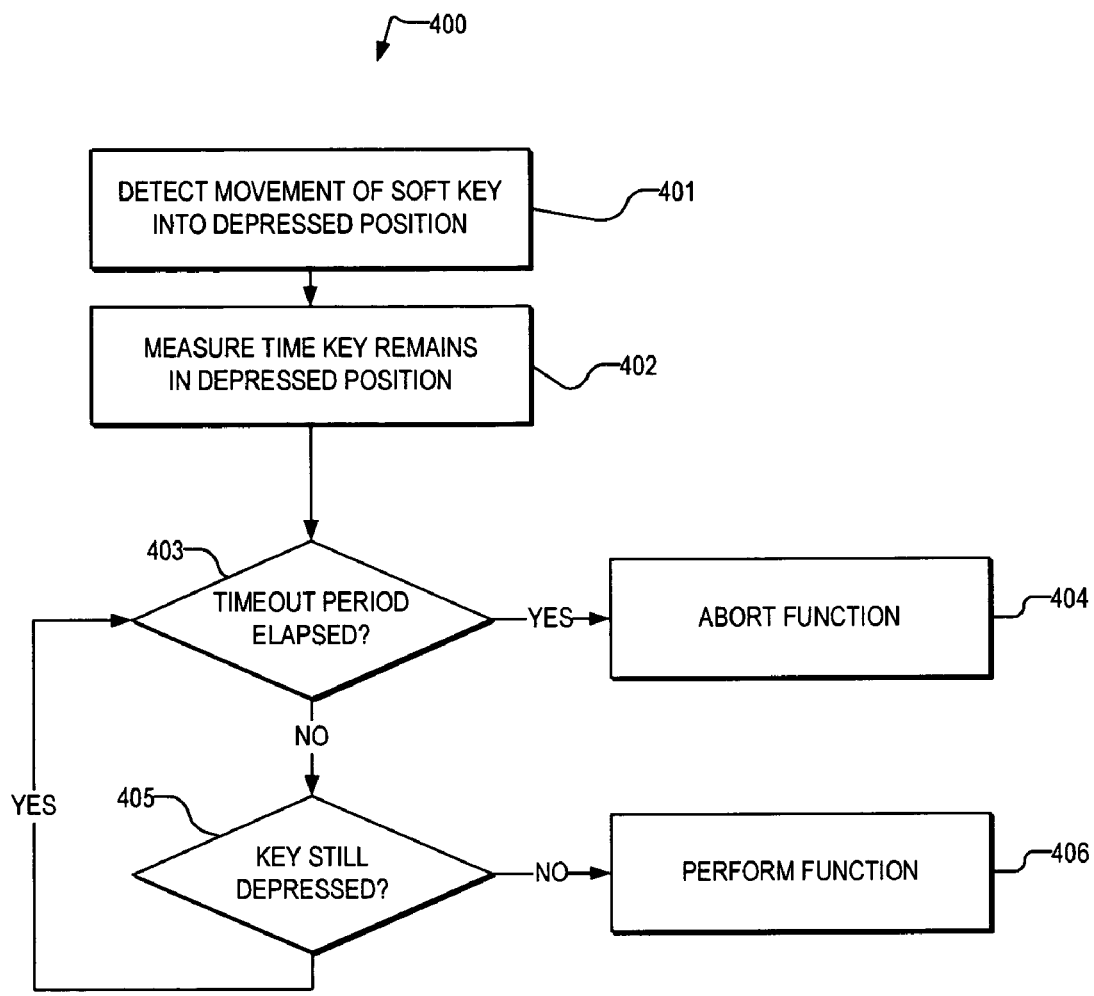
FIG. 4 is a flowchart of a method of operating a telephone, in accordance with embodiments of the present invention.

FIG. 4 is a flowchart of a method 400 of operating a telephone, in accordance with embodiments of the present invention. In step 401, the movement of a soft key into the depressed position is detected. In step 402, the time that the soft key remains in the depressed position is measured. In step 403, it is determined whether the timeout period has elapsed. If the timeout period has elapsed, the function is aborted in step 404. The display 110 may provide an indication of the aborting of the function, e.g., by ceasing highlighting of the function description in the display 110.

If the timeout period has not elapsed, then in step 405, it is determined whether the key is still depressed. If the key is no longer in the depressed position, then in step 406, the function is performed. If the key remains in the depressed position, then the method returns to step 403, in which the control unit 210 determines whether the timeout period has elapsed.

Embodiments of the present invention may provide various advantages not provided by prior art systems. In particular, a user of an electronic device is provided with the ability to abort a function even after the key associated with that function is pressed. This may be particularly useful with functions that cannot be reversed, such as the termination of a pending telephone call or the deletion of an entry in an in-phone address book database.

In addition, embodiments may be particularly useful in devices which lack pointing devices for selecting functions. In many personal computers, a user utilizes a pointing device, such as a mouse or trackball, in order to position a cursor to select a link or button shown on a display. If the user inadvertently clicks on the on-screen button, the user can use the pointing device to move the cursor away from the button before releasing the click. In a telephone, a typical soft key does not have a pointing or navigational control. Therefore, the user cannot simply move a cursor away from a button in order to abort the function. A timeout function in accordance with embodiments of the present invention can provide a user to abort the function without the use of a pointing or other navigational device.

While the invention has been described in terms of particular embodiments and illustrative figures, those of ordinary skill in the art will recognize that the invention is not limited to the embodiments or figures described. Other embodiments of the present invention may be implemented in devices other than telephones. For example, a timeout function may be provided for any software application operating on a computing device, where a function is initiated with a keypress. One popular application for personal computers, handheld computers, and mobile telephones is an instant messaging client. Typically, users will type a short message and press the "ENTER" key or "SEND" key to transmit the message to the designated recipient. However, a user may prematurely press "ENTER" and then realize that additional editing of the message would be desirable. The user may then retain the "ENTER" key in the depressed position until the timeout period has elapsed. Then the message transmit function would terminate and the user could release the "ENTER" key and return to editing the message.

In addition, the control circuitry for controlling the operation of the electronic device, such as the telephone, may vary and need not be limited to the arrangement shown in FIG. 2. In addition, the layout of the telephone 100 shown in FIG. 1 is merely exemplary and may vary in other embodiments.

In the embodiment shown in FIGS. 1-2, the soft keys 120 comprise physical buttons. In other embodiments, the soft keys may take other forms. For example, the display 110 may be a touch screen display and the soft keys are provided in graphical form on the display. Thus, the soft key comprises the touch-sensitive region of the display associated with the function.

In addition, while the telephone 100 shown in FIG. 1 is designed for use as a VoIP telephone, in other embodiments, the telephone may utilize other forms of telecommunications technology.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. An electronic device, comprising:
a key operable to be pressed into a depressed position, said key being associated with a function; and
a control system for initiating the function associated with the key, wherein if the key is pressed into the depressed position and released within a timeout period, the control initiates the function upon release of the key, and if the key is pressed into the depressed position and retained in the depressed position for the timeout period, the control system does not initiate the function upon release of the key.

2. The device of claim 1, wherein:
the electronic device comprises a telephone; and
the function comprises a call termination.

3. The device of claim 1, wherein:
the key is programmable to be associated with one of a plurality of functions.

4. The device of claim 1, wherein:
the key is associated with a plurality of functions; and
the function initiated by the control system upon release of the key is determined by an operating state of the device.

5. The device of claim 1, further comprising:
a display screen adjacent to the key, said display screen displaying the function of the key.

6. The device of claim 1, wherein:
the control system is operable to highlight the function description in the display screen upon detection of the key being pressed into the depressed position.

7. The device of claim 6, wherein:
the control system is operable to cease highlighting the function description in the display screen after the key has been retained in the depressed position for the timeout period.

8. The device of claim 1, further comprising:
a plurality of keys, each key being operable to be pressed into a depressed position and being associated with a function;
wherein the control system is operable to initiate the function associated with each of the plurality of keys.

9. The device of claim 1, wherein:
the function comprises the transmission of an instant message.

10. A telephone, comprising:
an audio subsystem;
a key operable to be pressed into a depressed position, said key being associated with a function;
a control system for initiating the function associated with the key, wherein if the key is pressed into the depressed position and released within a timeout period, the control initiates the function upon release of the key, and if the key is pressed into the depressed position and retained in the depressed position for the timeout period, the control system does not initiate the function upon release of the key.

11. The system of claim 10, wherein:
the function comprises a call termination.

12. The system of claim 10, wherein:
the key is associated with a plurality of functions; and
the function initiated by the control system upon release of the key is determined by an operating state of the telephone.

13. The system of claim 10, further comprising:
a display screen adjacent to the key;
wherein the control system is operable to display a description of the function associated with the key on the display screen.

14. The system of claim 13, wherein:
the control system is operable to highlight the function description in the display screen upon detection of the key being pressed into the depressed position.

15. The system of claim 14, wherein:
the control system is operable to cease highlighting the function description in the display screen after the key has been retained in the depressed position for the timeout period.

16. The system of claim 10, further comprising:
a plurality of keys, each key being operable to be pressed into a depressed position and being associated with a function;
wherein the control system is operable to initiate the function associated with each of the plurality of keys.

17. The system of claim 10, wherein:
said audio subsystem comprises a telephone handset, said telephone handset comprising a speaker and a microphone.

18. A method of operating an electronic device, comprising:
detecting movement of a key of the device into a depressed position, said key being associated with a function; and
if the key is released from the depressed position within a timeout period, initiating the function associated with the key, and if the key is retained in the depressed position for the timeout period, aborting initiation of the function.

19. The method of claim 18, wherein:
said electronic device comprises a telephone.

20. The method of claim 19, wherein:
said initiating the function comprises terminating a call.

21. The method of claim 18, further comprising:
displaying a description of the function associated with the key on a display screen adjacent to the key.

22. The method of claim 21, further comprising:
highlighting the function description in the display screen upon detection of the key being moved into the depressed position.

23. The method of claim 22, further comprising:
ceasing the highlighting of the function description in the display screen after the key has been retained in the depressed position for the timeout period.

* * * * *

UNITED STATES PATENT AND TRADEMARK OFFICE
CERTIFICATE OF CORRECTION

| | | |
|---|---|---|
| PATENT NO. | : 7,616,761 B1 | Page 1 of 1 |
| APPLICATION NO. | : 11/341103 | |
| DATED | : November 10, 2009 | |
| INVENTOR(S) | : Sam K. Sin | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this

Nineteenth Day of October, 2010

David J. Kappos
*Director of the United States Patent and Trademark Office*